(12) United States Patent
Wieczorek et al.

(10) Patent No.: US 8,590,712 B2
(45) Date of Patent: *Nov. 26, 2013

(54) MODULAR FILTER ELEMENTS FOR USE IN A FILTER-IN-FILTER CARTRIDGE

(75) Inventors: Mark T. Wieczorek, Cookeville, TN (US); Terry Shults, Cookeville, TN (US); William C. Haberkamp, Cookeville, TN (US); Jonathan Sheumaker, Cookeville, TN (US); Barry M. Verdegan, Stoughton, WI (US); Christopher E. Holm, Madison, WI (US); Brian W. Schwandt, Fort Atkinson, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/820,791

(22) Filed: Jun. 22, 2010

(65) Prior Publication Data

US 2011/0168647 A1    Jul. 14, 2011

Related U.S. Application Data

(63) Continuation-in-part of application No. 12/247,502, filed on Oct. 8, 2008, now Pat. No. 8,360,251, and a continuation-in-part of application No. 12/780,392, filed on May 14, 2010.

(60) Provisional application No. 61/179,939, filed on May 20, 2009, provisional application No. 61/179,170, filed on May 18, 2009, provisional application No. 61/178,738, filed on May 15, 2009.

(51) Int. Cl.
*B01D 29/00* (2006.01)
*B01D 29/56* (2006.01)
*B01D 29/58* (2006.01)
*B01D 35/00* (2006.01)
*B01D 36/00* (2006.01)
*B01D 29/07* (2006.01)
*B01D 17/02* (2006.01)

(52) U.S. Cl.
USPC ........... 210/490; 210/799; 210/295; 210/314; 210/315; 210/323.1; 210/323.2; 210/335; 210/337; 210/338; 210/342; 210/435; 210/437; 210/457; 210/488; 210/489; 210/492; 210/493.1; 210/493.2; 210/DIG. 5

(58) Field of Classification Search
None
See application file for complete search history.

(56) References Cited

U.S. PATENT DOCUMENTS 3,228,527 A * 1/1966 McPherson .................... 210/307
3,390,780 A * 7/1968 Bennett ......................... 210/338

(Continued)

FOREIGN PATENT DOCUMENTS

WO    2010042706    4/2010

OTHER PUBLICATIONS

International Search Report for PCT/US2011/031257 dated May 28, 2011.

(Continued)

*Primary Examiner* — Benjamin Kurtz
(74) *Attorney, Agent, or Firm* — Andrus, Sceales, Starke & Sawall, LLP

(57) ABSTRACT

Disclosed are modular filter-in-filter elements, namely an outer filter element and an inner filter element which may be assembled to form a filter cartridge for use in separation methods and systems. The outer filter element typically functions as a coalescing element and the inner element typically functions as a particulate filter element. The disclosed filter cartridges may be structured for separating water from a hydrocarbon-based liquid fuel as the fuel moves through the cartridge from outside to inside.

36 Claims, 8 Drawing Sheets

(56) References Cited

U.S. PATENT DOCUMENTS

| | | | | |
|---|---|---|---|---|
| 3,951,814 | A | 4/1976 | Krueger | |
| 3,960,719 | A | 6/1976 | Bresson | |
| 4,039,441 | A | 8/1977 | Fett | |
| 4,052,316 | A | 10/1977 | Berger, Jr. et al. | |
| 4,078,965 | A | 3/1978 | Berger, Jr. et al. | |
| 4,081,373 | A | 3/1978 | Rozniecki | |
| 4,083,778 | A | 4/1978 | McGrew | |
| 4,199,447 | A | 4/1980 | Chambers et al. | |
| 4,213,863 | A | 7/1980 | Anderson | |
| 4,251,369 | A | 2/1981 | Casad et al. | |
| 4,304,671 | A | 12/1981 | Labaquere | |
| 4,372,847 | A * | 2/1983 | Lewis | 210/86 |
| 4,640,781 | A | 2/1987 | Hughes | |
| 4,643,834 | A | 2/1987 | Batutis | |
| 4,759,782 | A | 7/1988 | Miller et al. | |
| 4,790,947 | A | 12/1988 | Arnold | |
| 4,888,117 | A | 12/1989 | Brown et al. | |
| 5,006,260 | A | 4/1991 | Roques et al. | |
| 5,037,454 | A | 8/1991 | Mann | |
| 5,068,035 | A | 11/1991 | Mohr | |
| 5,080,802 | A | 1/1992 | Cairo, Jr. et al. | |
| 5,112,498 | A | 5/1992 | Davies | |
| 5,156,745 | A | 10/1992 | Cairo, Jr. et al. | |
| 5,174,907 | A | 12/1992 | Chown et al. | |
| 5,242,604 | A | 9/1993 | Young et al. | |
| 5,275,729 | A * | 1/1994 | Gris | 210/472 |
| 5,401,404 | A | 3/1995 | Strauss | |
| 5,417,848 | A | 5/1995 | Erdmannsdorfer et al. | |
| 5,439,588 | A | 8/1995 | Chown et al. | |
| 5,443,724 | A | 8/1995 | Williamson et al. | |
| 5,454,937 | A | 10/1995 | Lewandowski | |
| 5,454,945 | A | 10/1995 | Spearman | |
| 5,468,382 | A | 11/1995 | Cook et al. | |
| 5,468,385 | A | 11/1995 | Inoue | |
| 5,480,547 | A | 1/1996 | Williamson et al. | |
| 5,500,132 | A | 3/1996 | Elmi | |
| 5,565,078 | A | 10/1996 | Sams et al. | |
| 5,575,896 | A | 11/1996 | Sams et al. | |
| 5,616,244 | A | 4/1997 | Seureau et al. | |
| 5,643,431 | A | 7/1997 | Sams et al. | |
| 5,656,173 | A | 8/1997 | Jordan et al. | |
| 5,750,024 | A | 5/1998 | Spearman | |
| 5,762,810 | A | 6/1998 | Pelton et al. | |
| 5,800,597 | A | 9/1998 | Perrotta et al. | |
| 5,861,087 | A | 1/1999 | Manning | |
| 5,874,008 | A | 2/1999 | Hirs | |
| 6,056,128 | A | 5/2000 | Glasgow | |
| 6,083,380 | A | 7/2000 | Selby et al. | |
| 6,099,729 | A | 8/2000 | Cella et al. | |
| 6,149,408 | A | 11/2000 | Holt | |
| 6,302,932 | B1 | 10/2001 | Unger et al. | |
| 6,332,987 | B1 | 12/2001 | Whitney et al. | |
| 6,419,721 | B1 | 7/2002 | Hunter | |
| 6,422,396 | B1 | 7/2002 | Li et al. | |
| 6,517,615 | B2 | 2/2003 | Miller et al. | |
| 6,605,224 | B2 | 8/2003 | Aymong | |
| 6,716,349 | B2 * | 4/2004 | Baracchi et al. | 210/299 |
| 6,730,236 | B2 | 5/2004 | Kouba | |
| 6,740,358 | B2 | 5/2004 | Speece, Jr. et al. | |
| 6,767,459 | B1 | 7/2004 | Sinker et al. | |
| 6,811,693 | B2 | 11/2004 | Nilsen et al. | |
| 6,884,349 | B1 | 4/2005 | Jiang | |
| 6,907,997 | B2 | 6/2005 | Thacker et al. | |
| 7,198,718 | B1 | 4/2007 | Turnbull | |
| 7,235,177 | B2 | 6/2007 | Herman et al. | |
| 7,297,279 | B2 | 11/2007 | Johnson et al. | |
| 7,326,266 | B2 | 2/2008 | Barnwell | |
| 7,416,657 | B2 | 8/2008 | Kretchmar | |
| 7,527,739 | B2 | 5/2009 | Jiang et al. | |
| 7,648,565 | B2 | 1/2010 | Clausen et al. | |
| 2004/0060858 | A1 | 4/2004 | Lucas et al. | |
| 2006/0137318 | A1 | 6/2006 | Lim et al. | |
| 2006/0242933 | A1 | 11/2006 | Webb et al. | |
| 2007/0039865 | A1 | 2/2007 | Jiang et al. | |
| 2007/0062886 | A1 | 3/2007 | Rego et al. | |
| 2007/0062887 | A1 | 3/2007 | Schwandt et al. | |
| 2007/0084776 | A1 * | 4/2007 | Sasur | 210/314 |
| 2007/0107399 | A1 | 5/2007 | Schwandt et al. | |
| 2007/0131235 | A1 | 6/2007 | Janikowski et al. | |
| 2007/0289915 | A1 | 12/2007 | Jiang et al. | |
| 2008/0053888 | A1 | 3/2008 | Ellis et al. | |
| 2008/0070022 | A1 | 3/2008 | Umezu et al. | |
| 2009/0020465 | A1 | 1/2009 | Jiang et al. | |
| 2009/0065419 | A1 | 3/2009 | Jiang | |
| 2009/0134097 | A1 | 5/2009 | Kerfoot | |
| 2009/0188870 | A1 | 7/2009 | Schroeder et al. | |
| 2009/0250402 | A1 | 10/2009 | Jiang et al. | |
| 2010/0101993 | A1 | 4/2010 | Wells et al. | |
| 2010/0219117 | A1 * | 9/2010 | Reiland et al. | 210/256 |

OTHER PUBLICATIONS

Written Opinion for PCT/US2011/031257 dated May 28, 2011.
International Search Report for PCT/US2011/031259 dated Oct. 28, 2011.
Written Opinion for PCT/US2011/031259 dated Oct. 28, 2011.
International Search Report for PCT/US2011/031259 dated May 24, 2011.
Written Opinion for PCT/US2011/031259 dated May 24, 2011.
International Preliminary Report on Patentability in PCT/US2011/031259, date of mailing Jan. 10, 2013.
International Preliminary Report on Patentability in PCT/US2011/031257, date of mailing Jan. 10, 2013.

* cited by examiner

MODULAR FILTER ELEMENTS FOR USE IN A FILTER-IN-FILTER CARTRIDGE

CROSS-REFERENCE TO RELATED APPLICATIONS

The present application is a continuation-in-part under 35 U.S.C. §120 of U.S. application Ser. No. 12/247,502, filed on Oct. 8, 2008, the content of which is incorporated herein by reference in its entirety. The present application also is a continuation-in-part under 35 U.S.C. §120 of U.S. application Ser. No. 12/780,392, filed on May 14, 2010, which claims the benefit under 35 U.S.C. §119(e) to U.S. Provisional Application Nos. 61/179,939, filed on May 20, 2009; 61/179,170, filed on May 18, 2009; and 61/178,738; filed on May 15, 2009, the contents of which are incorporated herein by reference in their entireties.

BACKGROUND

The field of the invention relates to filters such as filter-in-filter cartridges useful for fuel-water separation. In particular, the field relates to a filter-in-filter fuel-water separator and particulate filters preferably comprising thermoplastic material.

The subject matter of this application relates to U.S. application Ser. No. 12/820,784, filed concurrently herewith on Jun. 22, 2010, published as U.S. Published Patent Application No. 2011/0168,621, on Jul. 14, 2011, and entitled "TWO STAGE WATER SEPARATOR AND PARTICULATE FILTER", the content of which is incorporated herein by reference in its entirety.

Coalescers are used widely to remove immiscible droplets from a gaseous or liquid continuous phase, such as in crankcase ventilation (CV) filtration, fuel water separation (FWS), and oil-water separation. Prior art coalescer designs incorporate the principles of enhanced droplet capture and coalescence by utilizing graded capture (i.e., decreasing fiber diameter, pore size and/or porosity in coalescing media) or by utilizing thick depth coalescers. Wettability also is recognized as affecting coalescer performance. (See, e.g., U.S. Pat. No. 6,767,459 and U.S. published Patent Application Nos. 2007-0131235 and 2007-0062887). U.S. Pat. No. 5,443,724 discloses that the media should have a surface energy greater than water in order to improve coalescer performance (i.e., that the media should be preferentially wetted by both coalescing droplets and continuous phases). U.S. Pat. No. 4,081,373 discloses that coalescing media should be hydrophobic in order to remove water from fuel. U.S. published Patent Application No. 2006-0242933 discloses an oil-mist coalescer in which the filtration media is oleophobic, thereby enabling the fluid mist to coalesce into drops and drain from the filtration media.

With regard to the removal of water from fuel, there is a need to increase removal efficiency and to remove smaller droplets than in the past. This challenge is further magnified by the introduction of new fuels with lower interfacial tensions and different additive packages, than fuels in the past. In particular, ultra low sulfur diesel (ULSD) fuel and biodiesel tend to have lower interfacial tensions (IFT), and therefore have smaller droplet size and more stable emulsions than previous diesel fuel. In fuels with lower interfacial tension, the size of dispersed droplets is decreased, making the droplets more difficult to remove. Enhanced coalescence therefore is needed to meet these challenges. Improved coalescers that include improved coalescing media also are desirable because they permit the use of a smaller media pack in view of improved coalescing efficiency. In fuels with lower interfacial tension, the size of droplets is decreased, making the droplets more difficult to remove.

Traditional fuel-water separators (FWS) tend to be single-stage devices designed to be used upstream of the fuel pump. In traditional FWS, the filter media is phobic with respect to the dispersed water phase and acts as a barrier. However, traditional FWS tend not to provide adequate water removal for ULSD fuel and biodiesel with low IFTs (<15 dynes/cm) and low separability (<50%) because their pore size tends to be too large to effectively capture the small droplets. As such, a large droplet size is required for effective capture. This large droplet size also is a requirement necessitated by the need to maintain the pressure drop across the FWS to well below the 1 atmosphere of pressure available when the FWS is use upstream of the fuel pump. Also, even when the mean pore size is sufficiently small, FWS media and fibrous filter media in general possess a maximum pore size so large that excessive amounts of water passes through these large pores. In modern high pressure common rail fuel systems where it is important to remove nearly all non-dissolved water from fuel passing to the injectors, the amount of water that passes through these large pores is unacceptable. Also, in modern HPCR fuel systems it is often desirable for the fuel water separator to be located on the pressure side of the pump, where the filter is exposed to higher pressures and the size of water droplets is much smaller. Traditional two-stage fuel-water coalescers (FWC) are designed to be used downstream of the fuel pump and tend to be two-stage devices for fuel in which the first stage captures the droplets, holds them so coalescence can occur, then releases the enlarged drops which are removed by sedimentation/settling, typically after being blocked by the second separator stage (where the second separator stage acts as an FWS). Traditional two-stage FWC tend to provide higher removal efficiency than FWS, but tend to have insufficient life, due to plugging by solids or semisolids. To varying degrees, both FWS and FWC are adversely affected by the presence of surfactants in fuels that lower interfacial tension, reduce droplet size, slow down the rate of coalescence, stabilize emulsions, and may adsorb onto media and render it less effective. As such, there is a need for improved fuel-water separators that exhibit a high efficiency, low pressure drop, and are minimally affected by low interfacial tension and the presence of surfactants.

SUMMARY

Disclosed are modular filter-in-filter elements, namely an outer filter element and an inner filter element which may be assembled to form a filter cartridge for use in separation methods and systems. The outer filter element typically functions as a coalescing element and the inner element typically functions as a particulate filter element and for the separation of coalesced water drops from the fuel. The disclosed filter cartridges may be structured for separating water from a hydrocarbon-based liquid fuel as the fuel moves through the cartridge from outside to inside.

In the disclosed cartridges, the inner filter element is located within the outer filter element. The outer filter element includes: (i) an outer pleated filter material where the outer pleated filter material preferably is polymeric material (e.g., thermoplastic material) and has a substantially cylindrical or oval shape; (ii) optionally an inner non-pleated filter material in contact directly or indirectly with the outer pleated filter material at inner pleat tips of the outer pleated filter material, wherein the inner non-pleated filter material preferably is polymeric material (e.g., thermoplastic material) and has a substantially cylindrical shape; and (iii) end caps attached to opposite ends of the outer pleated filter material and the inner non-pleated filter material. The inner filter element includes: (i) an outer non-pleated filter material where the outer non-pleated filter material preferably is polymeric material (e.g., thermoplastic material), preferably hydrophobic material, and has a substantially cylindrical shape; (ii) an inner pleated filter material in contact directly or indirectly with the outer non-pleated filter material, wherein the inner pleated filter material preferably is polymeric material (e.g., thermoplastic material) and has a substantially cylindrical shape; and (iii) end caps attached to opposite ends of the outer non-pleated filter material and the inner pleated filter material. The outer filter element and the inner filter element may share one or both end caps. For example, one or both ends of the filter material of the outer element and one or both ends of the filter material of the inner element may be attached to the same end cap.

The outer filter element of the disclosed filter cartridges optionally may include: (iv) an optional support structure, which typically is a perforated or screen material. In some embodiments of the disclosed filter cartridges, the support structure is located at the outer face of the inner non-pleated filter material of the outer filter element. For example, the inner non-pleated filter material may be in indirect contact with the outer pleated filter material of the outer filter element at the inner pleat tips via the support structure. In other embodiments, the support structure is located at the inner face of the inner non-pleated filter material of the outer filter element and the inner non-pleated filter material is in direct contact with the outer pleated filter material. Suitable support structures may include but are not limited to a tube, a screen, a cage-like structure, and a spring.

The outer filter element comprises outer pleated filter material which may include one or more layers of media material referred to as a "nanofiber layer," which has preferable characteristics for coalescing droplets of water present in hydrocarbon fuel as the fuel passes through the outer pleated filter material. Typically, the nanofiber layer has a mean pore size, M, where 0.2 μm≤M≤12.0 μm (preferably 0.2 μm≤M≤10.0 μm, and more preferably 0.2 μm≤M≤8.0 μm, e.g., 0.2, 0.8, 1.2, 1.6, 2.0, 2.4, 2.8, 3.2, 3.6, 4.0, 4.4, 4.8, 5.2, 5.6, 6.0, 6.4, 6.8, 7.2, 7.6 or 8.0 μm). The media material of the nanofiber layer typically has a maximum pore size $M_M$ and typically 1≤$M_M$/M≤3, preferably 1≤$M_M$/M≤2 (e.g., maximum pore sizes $M_M$ may include 3, 6, 9, 12, 15, 18, 21, 24, 27, 30, 33, and 36 μm). The media material of the nanofiber layer typically includes fibers where the fibers have a mean diameter of less than about 1 μm and in some embodiments between 0.07 μm and 1 μm (preferably between 0.15 μm and 1 μm, e.g., 0.2, 0.3, 0.4, 0.5, 0.6, 0.7, 0.8, 0.9, or 1.0 μm). The media material of the nanofiber layer typically includes nonwoven polymeric material (e.g., polyamide material), which may be formed by electroblowing. The media material has a suitable permeability. A suitable permeability may include a permeability of less than about 40 cfm (preferably less than about 30 cfm, more preferably less than about 20 cfm, e.g., 19, 18, 17, 16, 15, 14, 13, 12, 11, or 10 cfm). The nanofiber layer of media material has a desirable thickness as measured from upstream to downstream relative to flow through the cartridge (i.e., as measured from outside to inside). Suitable thicknesses include thicknesses between 0.05 and 0.4 mm (preferably between 0.1 and 0.3 mm, e.g., 0.10, 0.12, 0.14, 0.16, 0.18, 0.20, 0.22, 0.24, 0.26, 0.28, and 0.30 mm). The nanofiber layer of media material preferably has a basis weight at least about 10 gsm (or at least 20 gsm or 30 gsm).

In addition to the nanofiber layer of media material of the outer pleated filter material of the outer filter element as described above, the outer pleated filter material may include additional layers of media material having the same or different characteristics as the nanofiber layer of media material described above. For example, the outer pleated filter material of the outer filter element may include one or more additional layers of media material upstream or downstream of the layer of media material described above. In some embodiments, the outer pleated filter material of the outer filter element includes an additional layer of media material that is upstream of the layer of media material described above, namely an upstream first layer of media material and a downstream second layer of media material as described above. The first layer and the second layer of media material have mean pore sizes $M_1$ and $M_2$, respectively, and preferably $M_1$>$M_2$. For example, $M_1$ may be at least about 2.5×, 5×, or 10× greater than $M_2$ (e.g., $M_1$≥10 μm, $M_1$≥20 μm, or $M_1$≥30 μm). The additional layer of upstream media material may include fibers, where the fibers have an average fiber diameter of 1-100 μm, 3-100 μm, 10-100 μm, 20-100 μm, or 40-100 μm. The additional layer of upstream media material has a suitable permeability. A suitable permeability for the upstream media material may include a permeability of between about 20-500 cfm (preferably between about 30-400 cfm, more preferably between about 40-300 cfm, e.g., 50, 75, 100, 125, 150, 175, 200, 225, 250, 275, or 300 cfm).

In other embodiments, the outer pleated filter material of the outer filter element includes an additional layer of media material that is downstream of the nanofiber layer of media material described above, namely an upstream first layer of media material as described above and a downstream second layer of media material. The first layer and the second layer have mean pore sizes $M_1$ and $M_2$, respectively, and preferably $M_1$<$M_2$. For example, $M_2$ may be at least about 2.5×, 5×, or 10× greater than $M_1$ (e.g., $M_2$≥10 μM, $M_2$≥20 μm, or $M_2$≥30 μm). The additional layer of downstream media material may include fibers, where the fibers have an average fiber diameter of 1-100 μm, 3-100 μm, 10-100 μm, 20-100 μm, or 40-100 μm. The additional layer of downstream media material has a suitable permeability. A suitable permeability for the downstream media material may include a permeability of between about 20-500 cfm (preferably between about 30-400 cfm, more preferably between about 40-300 cfm).

In further embodiments, the outer pleated filter material of the outer filter element may include an additional layer upstream of the least one layer of media material described above and an additional layer of media material downstream of the nanofiber layer of media material described above, namely an upstream first layer of media material, an interior second layer of media material as described above, and a downstream third layer of media material. The first layer, second layer (i.e., a middle layer or "the nanofiber layer" as described above), and third layer have mean pore sizes $M_1$, $M_2$, and $M_3$, respectively, and preferably $M_1$>$M_2$ and $M_3$>$M_2$. For example, $M_1$ may be at least about 2.5×, 5×, or 10× greater than $M_2$ and/or $M_3$ may be at least about 2.5×, 5×, or 10× greater than $M_2$ (e.g., $M_1$ and/or $M_3$≥10 μm; $M_1$ and/or $M_3$≥20 μm; or $M_1$ and/or $M_3$≥30 μm). The additional layers of upstream and downstream media material may include fibers, which may be the same or different, where the fibers have an average fiber diameter of 1-100 μm (preferably 10-100 μm, more preferably 20-100 μm). The additional layers of upstream media material and downstream media material have suitable permeabilities, which may be the same or different. A suitable permeability for the upstream media material and the downstream media material may include a permeability of between about 20-500 cfm (preferably between about 30-400 cfm, more preferably between about 40-300 cfm).

Where the outer pleated filter material of the outer filter element is a composite material (e.g., comprising multiple layers), the mean pore size, M, for the composite material may be determined. Preferably, the composite material has a mean pore size, M, where $0.2\ \mu m \leq M \leq 12.0\ \mu m$ (more preferably $0.2\ \mu m \leq M \leq 10.0\ \mu m$, and even more preferably $0.2\ \mu m \leq M \leq 8.0\ \mu m$). Further, the composite material has a maximum pore size $M_M$ and typically $1 \leq M_M/M \leq 5$, preferably $1 \leq M_M/M \leq 3$, more preferably $1 \leq M_M/M \leq 2$ (e.g., maximum pore sizes $M_M$ may include 3, 6, 9, 12, 15, 18, 21, 24, 27, 30, 33, and 36 µm). Preferably, the composite material has a permeability of less than about 40 cfm (more preferably less than about 30 cfm, even more preferably less than about 20 cfm).

The outer pleated filter material of the outer filter element typically functions to coalesce droplets of water present in hydrocarbon fuel as the fuel passes through the outer pleated filter material. Optionally, the outer pleated filter material may comprise slits or holes (e.g., approximately 30-300 µm in size) that are present in the valleys of the pleats and function as release points for coalesced drops of water.

In a further embodiment, the outer filter element optionally includes an inner non-pleated filter material downstream of the outer pleated filter material that preferably functions as a release layer for coalesced drops of water as the coalesced drops drain from the outer pleated filter material. In some embodiments, the inner non-pleated filter material has a mean pore size, M, where $20\ \mu m \leq M \leq 100\ \mu m$ (preferably $25\ \mu m \leq M \leq 50\ \mu m$, and more preferably $30\ \mu m \leq M \leq 40\ \mu m$). The inner non-pleated filter material typically includes fibers, and preferably the fibers have a mean diameter between 10-100 µm (more preferably between 20-100 µm). The inner non-pleated filter material typically includes nonwoven polymeric material (e.g., polyethylene terephthalate material). The inner non-pleated filter material has a suitable permeability. A suitable permeability may include a permeability of between about 100-400 cfm (preferably between about 150-250 cfm). The inner non-pleated filter material has a desirable thickness as measured from upstream to downstream relative to flow through the cartridge (i.e., as measured from outside to inside). Suitable thicknesses include thicknesses between about 0.6 and 2 mm (preferably between about 0.8 and 1.2 mm).

Referring now to the inner filter element, this element includes an outer non-pleated filter material and an inner pleated filter material (e.g., where the outer non-pleated filter material contacts the inner pleated filter material either directly or indirectly). Preferably, the outer non-pleated filter material of the inner filter element is hydrophobic (e.g., where a drop of water in the hydrocarbon fuel has a contact angle on the outer non-pleated filter material of the inner filter element that is no less than 90° (preferably no less than 120°, more preferably no less than 135°). Preferably, the outer non-pleated filter material of the inner filter element includes a woven thermoplastic mesh or screen (e.g., a mesh or screen having an opening less than 100 µm, and preferably less than 50 µm). The outer non-pleated filter material has a suitable permeability (e.g., between about 300-700 cfm, and preferably between about 400-600 cfm).

The inner filter element comprises inner pleated filter material. Typically, the inner pleated filter material of the inner filter element includes one or more layers of media material and at least one layer of the media material has a mean pore size, M, that is less than any mean pore size of any layer of the outer pleated filter of the outer filter element (e.g., where $0.2\ \mu m \leq M \leq 6.0\ \mu m$, preferably $0.2\ \mu m \leq M \leq 5.0\ \mu m$, more preferably $0.2\ \mu m \leq M \leq 4.0\ \mu m$, e.g., 0.2, 0.6, 0.8, 1.0, 1.6, 2.2, 2.8, 3.4, or 4.0 µm). The media material has a maximum pore size $M_M$ and typically $1 \leq M_M/M \leq 3$, preferably $1 \leq M_M/M \leq 2$. Preferably, the media material of the at least one layer includes fibers having a mean diameter less than about 1 µm (e.g., 1, 0.8, 0.6, 0.4, or 0.2 µm), and preferably the fibers are nonwoven polymeric material (e.g., polyamide material). The media material has a suitable permeability. A suitable permeability may include a permeability of less than about 40 cfm (preferably less than about 20 cfm, more preferably less than about 15 cfm, even more preferably less than about 10 cfm, e.g., 9, 8, 7, 6, 5, or 4 cfm). The at least one layer of media material has a desirable thickness as measured from upstream to downstream relative to flow through the cartridge (i.e., as measured from outside to inside). Suitable thicknesses include thicknesses between about 0.05 and 0.4 mm (preferably between about 0.1 and 0.3 mm, e.g., 0.10, 0.12, 0.14, 0.16, 0.18, 0.20, 0.22, 0.24, 0.26, 0.28, and 0.30 mm). The at least one layer of media material preferably is nanofiber material having a preferable basis weight (e.g., at least about 10 gsm, 20 gsm, or 30 gsm).

In addition to the at least one layer of media material of the inner pleated filter material of the inner filter element as described above, the inner pleated filter material may include additional layers of media material having the same or different characteristics as the at least one layer of media material described above. For example, the inner pleated filter material of the inner filter element may include one or more additional layers of media material upstream or downstream of the layer of media material described above. In some embodiments, the inner pleated filter material of the inner filter element includes an additional layer of media material that is upstream of the layer of media material described above, namely an upstream first layer of media material and a downstream second layer of media material as described above. The first layer and the second layer of media material have mean pore sizes $M_1$ and $M_2$, respectively, and preferably $M_1 > M_2$. For example, $M_1$ may be at least about 2.5×, 5×, or 10× greater than $M_2$ (e.g., $M_1 \geq 10\ \mu m$, $M_1 \geq 20\ \mu m$, or $M_1 \geq 30\ \mu m$). The additional layer of upstream media material may include fibers, where the fibers have an average fiber diameter of 1-100 µm, 3-100 µm, 10-100 µm, 20-100 µm, or 40-100 µm). The additional layer of upstream media material has a suitable permeability. A suitable permeability for the upstream media material may include a permeability of between about 20-300 cfm (preferably between about 40-300 cfm, more preferably between about 60-300 cfm).

In other embodiments, the inner pleated filter material of the inner filter element includes an additional layer of media material that is downstream of the at least one layer of media material described above, namely an upstream first layer of media material as described above and a downstream second layer of media material. The first layer and the second layer have mean pore sizes $M_1$ and $M_2$, respectively, and preferably $M_1 < M_2$. For example, $M_2$ may be at least about 2.5×, 5×, or 10× greater than $M_1$ (e.g., $M_2 \geq 10\ \mu m$, $M_2 \geq 20\ \mu m$, or $M_2 \geq 30\ \mu m$). The additional layer of downstream media material may include fibers, where the fibers have an average fiber diameter of 10-100 µm, 20-100 µm, or 40-100 µm. The additional layer of downstream media material has a suitable permeability. A suitable permeability for the downstream media material may include a permeability of between about 20-300 cfm (preferably between about 40-300 cfm, more preferably between about 60-300 cfm).

In further embodiments, the inner pleated filter material of the inner filter element may include an additional layer upstream of the least one layer of media material described above and an additional layer of media material downstream of the at least one layer of media material described above, namely an upstream first layer of media material, an interior second layer of media material as described above, and a downstream third layer of media material. The first layer, second layer (i.e., a middle layer or "the at least one layer" as described above), and third layer have mean pore sizes $M_1$, $M_2$, and $M_3$, respectively, and preferably $M_1 > M_2$ and $M_3 > M_2$. For example, $M_1$ may be at least about 2.5×, 5×, or 10× greater than $M_2$ and/or $M_3$ may be at least about 2.5×, 5×, or 10× greater than $M_2$ (e.g., $M_1$ and/or $M_3 \geq 10$ μm; $M_1$ and/or $M_3 \geq 20$ μm; or $M_1$ and/or $M_3 \geq 30$ μm). The additional layers of upstream and downstream media material may include fibers, which may be the same or different, where the fibers have an average fiber diameter of 1-100 μm, 10-100 μm, 20-100 μm, or 40-100 μm. The additional layers of upstream media material and downstream media material have suitable permeabilities, which may be the same or different. A suitable permeability for the upstream media material and the downstream media material may include a permeability of between about 20-500 cfm (preferably between about 30-400 cfm, more preferably between about 40-300 cfm).

Where the inner pleated filter material of the inner filter element is a composite material (e.g., comprising multiple layers), the mean pore size, M, for the composite material may be determined. Preferably, the composite material has a mean pore size, M, where 0.2 μm ≤ M ≤ 6.0 μm (more preferably 0.2 μm ≤ M ≤ 5.0 μm, even more preferably 0.2 μm ≤ M ≤ 4.0 μm). M for the composite material of the inner pleated material of the inner filter element typically is smaller than M for the composite material of the outer pleated material of the outer filter element. The composite material of the inner pleated filter material may have a maximum pore size $M_M$ and typically $1 \leq M_M/M \leq 5$, preferably $1 \leq M_M/M \leq 3$, more preferably $1 \leq M_M/M \leq 2$. Preferably, the composite material of the inner pleated filter material has a permeability of less than about 40 cfm (preferably less than about 20 cfm, more preferably less than about 15 cfm, even more preferably less than about 10 cfm, e.g., 9, 8, 7, 6, 5, or 4 cfm).

The outer filter element and the inner filter element of the disclosed cartridges typically include pairs of end caps, which optionally are shared. Typically, the outer pleated material and the optional inner non-pleated material of the outer filter element are attached to the end caps of the outer filter element at the respective ends of the outer pleated material and the optional inner non-pleated material of the outer filter element. Typically, the outer non-pleated material and the inner pleated material of the inner filter element are attached to the end caps of the inner filter element at the respective ends of the outer non-pleated material and the inner pleated material of the inner filter element. In some embodiments, the outer filter element and the inner filter element may share a top or bottom end cap (i.e., where the filter material of the outer filter element and the filter material of the inner filter element both are embedded in the same end cap which may be at the top or the bottom of the filter material). The end caps of the outer filter element and/or the inner filter element may be attached to the respective ends of the filter material in any suitable manner, including manners that prevent bypass of unfiltered fluid around the media. Suitable attachments include potting in an adhesive (e.g., polyurethane) or embedding the ends of the filter media in thermoplastic end caps. Preferably, the end caps of the outer filter element and/or inner filter element comprise polymeric material (e.g., polyurethane material). In some embodiments, the end caps comprise metal end caps that contain polyurethane or other potting adhesive for the filter material.

In some embodiments, the entire filter cartridge is polymeric material such as thermoplastic material. Accordingly, the entire cartridge can be recycled or incinerated, the layers of media material can be bonded together more easily where consecutive layers are both thermoplastic, chemical resistance and compatibility for thermoplastic material typically is better than other options such as cellulose material, and further, media properties such as mean pore size and distribution can be more easily controlled.

The outer filter element and the inner filter element may be assembled to form a filter cartridge as contemplated herein. The disclosed cartridges may be enclosed in a containment structure such as housings known in the art. Suitable housings typically include one or more inlets to receive fluid for filtering and one or more outlets or drains for discharging filtered fluid (e.g., hydrocarbon liquid) and/or coalesced drops of a dispersed phase (e.g., water).

The disclosed filter cartridges may be utilized in systems and methods for separating a dispersed phase from a continuous phase. In some embodiments, the disclosed filter cartridges may be used in systems and methods for fuel water separation, including systems and methods for removing water dispersed in hydrocarbon fuel. The systems and methods further may include or utilize hydrophobic media or an additional device positioned downstream of the disclosed cartridges for removing additional water from the filtered fuel. Additional devices may include, but are not limited to a gravity separator, centrifuge, impactor, lamella separator, inclined stacked plate, screen, water absorber (e.g., a super-absorbent polymer or hydrogel), and quiescent chamber. Preferably, the disclosed cartridges may be utilized in systems and methods that are effective for removing at least about 93%, 95%, 97%, or 99% of water dispersed in hydrocarbon fuel.

DETAILED DESCRIPTION

Figures 1, 2:
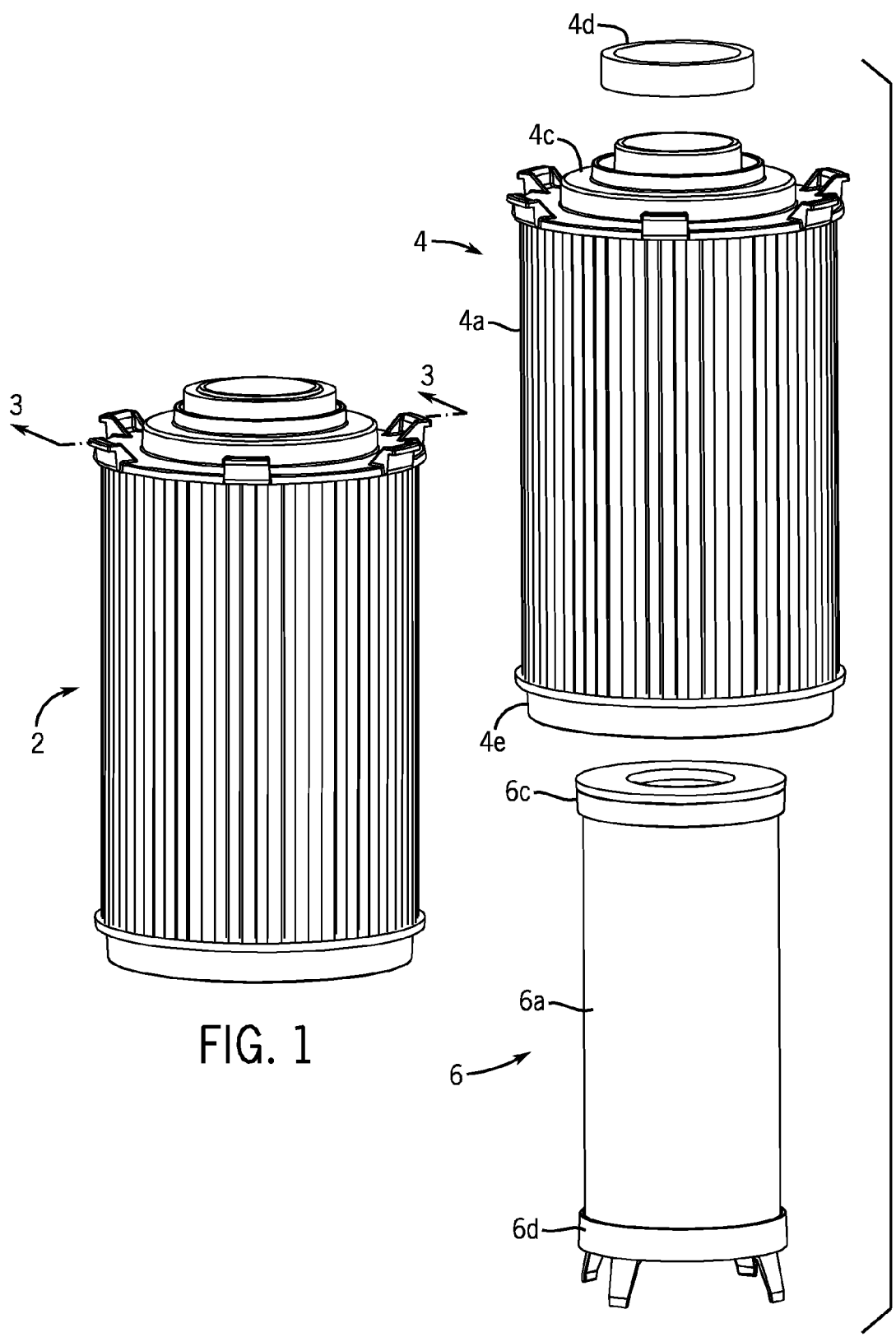
FIG. 1 illustrates one embodiment of a filter cartridge as contemplated herein.
FIG. 2 is an exploded view of the embodiment of FIG. 1.
Figure 3:
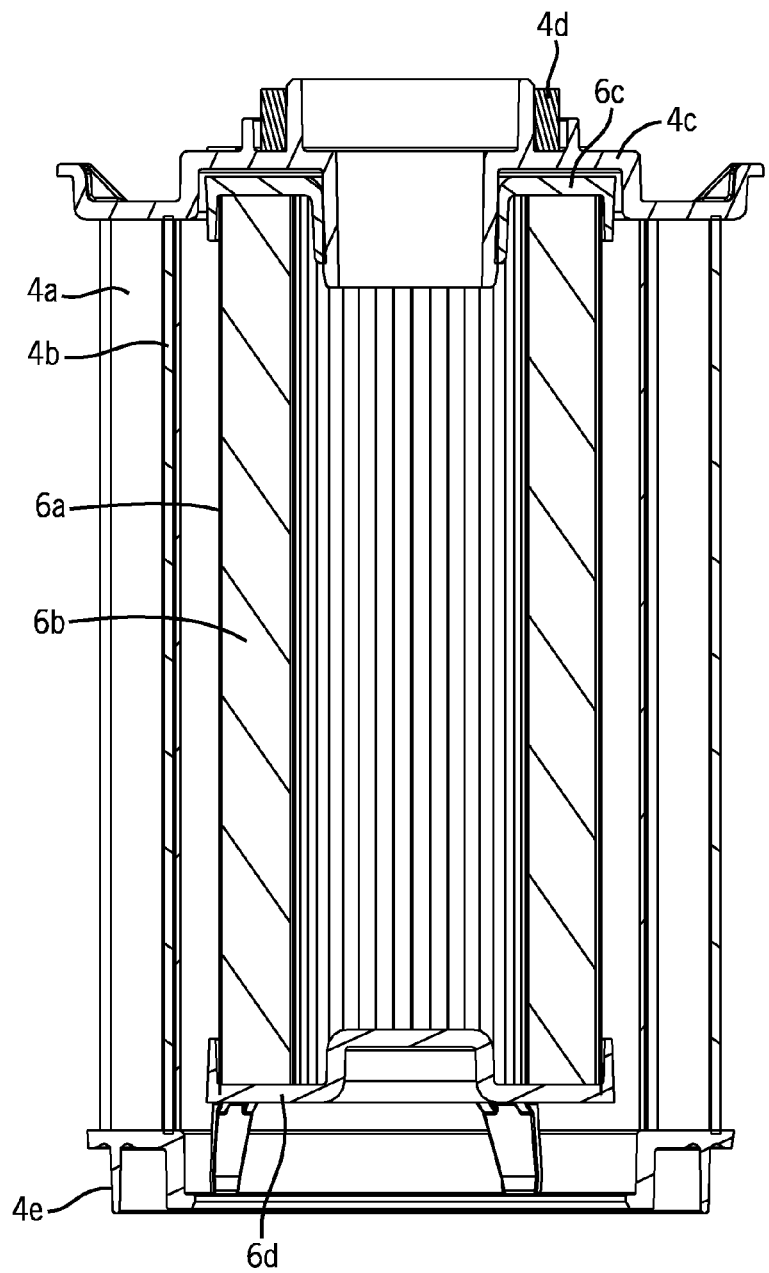
FIG. 3 illustrates a traverse cross-sectional view of the embodiment of FIG. 1 along 3-3.
Figures 4, 5:
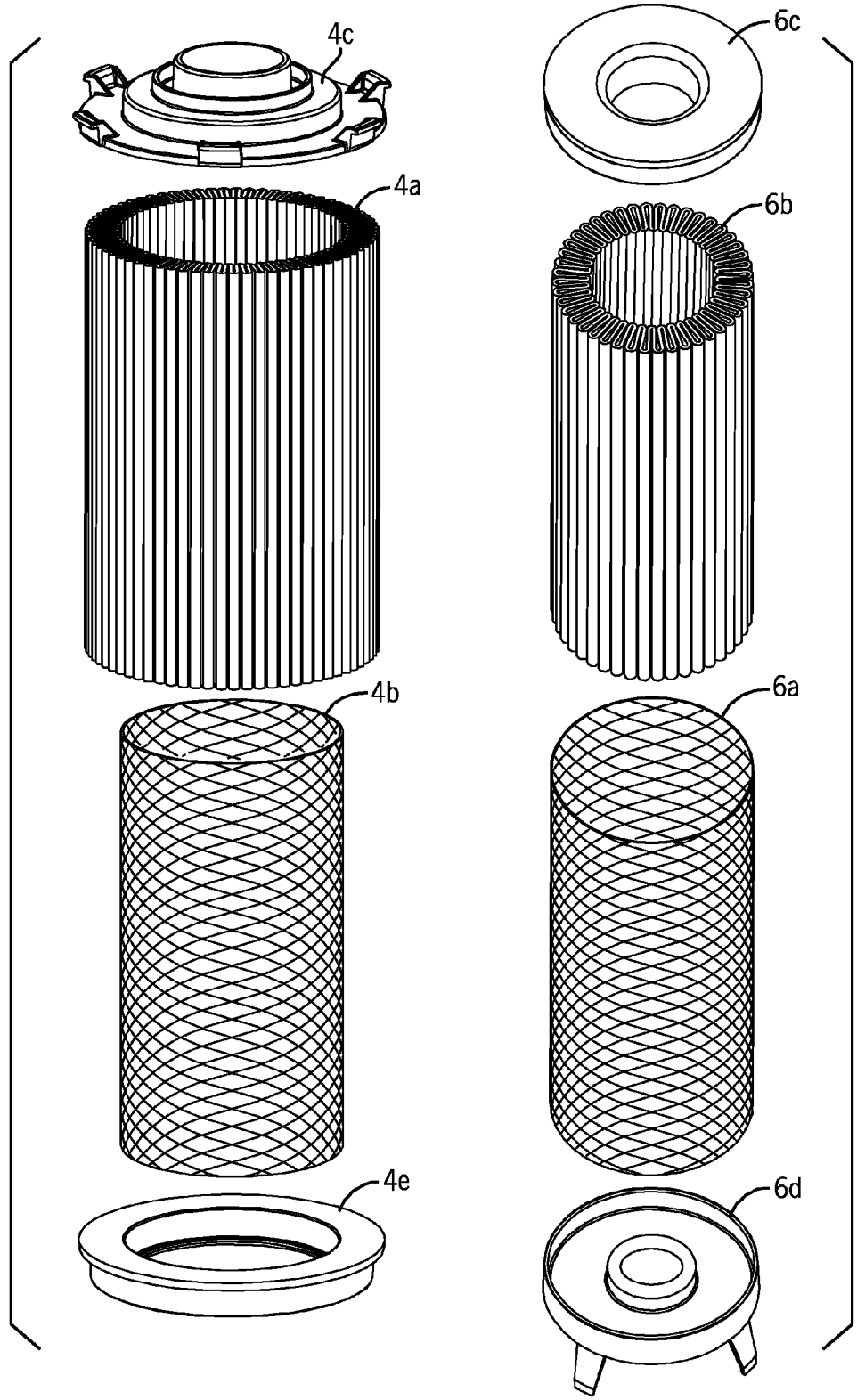
FIG. 4 illustrates an exploded view of one embodiment of an outer element as contemplated herein.
FIG. 5 illustrates an exploded view of one embodiment of an inner element as contemplated herein.

Disclosed are modular filter-in-filter elements, namely an outer filter element and an inner filter element which may be assembled to form a filter cartridge for use in separation methods and systems. The modular filter-in-filter elements and filter cartridges assembled therefrom may be further described as follows.

The outer filter element and inner filter element include or utilize media that comprises one or more layers of media material for filtering a mixture of a continuous phase and a dispersed phase and coalescing the dispersed phase. Such media may be referred to herein as "coalescing media material." As contemplated herein, the one or more layers may have a desirable pore size, porosity, and fiber diameter. The one or more layers may be homogenous (i.e., comprising a single type of material) or heterogeneous (i.e., comprising intermixed materials). The terms "pore size," "porosity," and "fiber diameter," may refer to "average" or "mean" values for these terms (e.g., where the layer is heterogeneous or graded and "pore size," "porosity," and "fiber diameter," are reported as mean pore size, average porosity, or average fiber diameter for the heterogeneous layer).

The disclosed cartridges may be utilized in separation methods or systems for removing a dispersed phase from a continuous phase. In some embodiments, the disclosed cartridges are utilized to separate an aqueous liquid (e.g., water) from a mixture of the aqueous liquid dispersed in hydrocarbon liquid. As contemplated herein, a hydrocarbon liquid primarily includes hydrocarbon material but further may include non-hydrocarbon material (e.g., up to about 1%, 5%, 10%, or 20% non-hydrocarbon material). Hydrocarbon liquid may include hydrocarbon fuel.

The outer filter element and inner filter element may include media that is woven or non-woven. Further, the outer filter element and inner filter element may include media that is polymeric or non-polymeric. Suitable polymeric material may include, but is not limited to polyamide material, polyalkylene terephthalate material (e.g., polyethylene terephthalate material or polybutylene terephthalate material), polyester material, halocarbon material (e.g., Halar® brand ethylene chlorotrifluoroethylene (ECTFE), and polyurethane material. Polymeric materials may include thermoplastic materials.

The outer filter element and inner filter element may include or utilize multilayer media. Such media may be formed by melt-blowing two different layers of media, one of top of another, by a wet laid process, electrospinning, electroblowing, melt-spinning, ultrasonic bonding, chemical bonding, physical bonding, co-pleating, or other means or combination.

The outer filter element, inner filter element, and filter cartridges assembled therefrom may be utilized in filtering and coalescing systems and methods as known in the art. (See, e.g., U.S. Pat. Nos. 7,527,739; 7,416,657; 7,326,266; 7,297,279; 7,235,177; 7,198,718; 6,907,997; 6,884,349; 6,811,693; 6,740,358; 6,730,236; 6,605,224; 6,517,615; 6,422,396; 6,419,721; 6,332,987; 6,302,932; 6,149,408; 6,083,380; 6,056,128; 5,874,008; 5,861,087; 5,800,597; 5,762,810; 5,750,024; 5,656,173; 5,643,431; 5,616,244; 5,575,896; 5,565,078; 5,500,132; 5,480,547; 5,480,547; 5,468,385; 5,454,945; 5,454,937; 5,439,588; 5,417,848; 5,401,404; 5,242,604; 5,174,907; 5,156,745; 5,112,498; 5,080,802; 5,068,035; 5,037,454; 5,006,260; 4,888,117; 4,790,947; 4,759,782; 4,643,834; 4,640,781; 4,304,671; 4,251,369; 4,213,863; 4,199,447; 4,083,778; 4,078,965; 4,052,316; 4,039,441; 3,960,719; 3,951,814; and U.S. published Application Nos. 2009-0020465; 2009-0134097; 2007-0289915; 2007-0107399; 2007-0062887; 2007-0062886; and 2007-0039865; the contents of which are incorporated herein by reference in their entireties.) The coalescing media disclosed herein may be manufactured utilizing methods known in the art and may include additional features disclosed in the art. (See, e.g., patents and published application references above and U.S. Pat. Nos. 6,767,459; 5,443,724; and 4,081,373; and U.S. published Patent Application Nos. 2007-0131235; 2007-0062887; and 2006-0242933; the contents of which are incorporated herein by reference in their entireties).

The disclosed filter cartridges assembled therefrom may be utilized for removing a dispersed phase (e.g., water) from a continuous phase (e.g., hydrocarbon fuel). For example, the filter cartridges assembled may be utilized for removing a dispersed phase from a continuous phase where at least about 93, 95, 97, or 99% of the dispersed phase is removed from the continuous phase after the phases are passed through the cartridges.

The coalescing media described herein may comprise material having distinct hydrophilicity or hydrophobicity, or distinct oleophilicity or oleophobicity. In some embodiments, the coalescing media comprises a layer of material comprising relatively hydrophobic material, relative to the dispersed phase of the mixture. In some embodiments, the outer filter element and the inner filter element comprise one or more layers of media material that are hydrophobic. The property of hydrophobicity of a media material may be accessed by measuring a contact angle ($\theta$) of a dispersed phase (e.g., water) in a continuous phase (e.g., hydrocarbon fuel) on the media material.

Referring now to FIGS. 1-5, shown is one embodiment of an outer filter element 4, inner filter element 6, and filter cartridge 2 assembled therefrom. The outer element 4 includes pleated filter media 4a in a cylindrical shape in direct or indirect contact with a non-pleated cylinder of media 4b at the inner pleat tips of the pleated cylinder. The pleated and non-pleated cylinders are bonded, potted, embedded, or otherwise attached at their ends to endcaps (4c, top end cap, and 4e, bottom end cap) located at opposite ends of the cylinders. The top end cap 4c optionally includes a gasket 4d. The non-pleated cylinder 4b may be directly or indirectly in contact with the inner pleat tips of the pleated cylinder 4a. Typically, the distance between the inner tips of the pleated section and the non-pleated cylinder is such that there is no significant gap or separation between the tips and the cylinder. The inner element 6 includes outer non-pleated filter media 6a in a cylindrical shape in direct or indirect contact with an inner pleated cylinder of media 6b. As such, the inner element's configuration (i.e., outer non-pleated filter media and inner pleated filter media) is in contrast to the outer filter element's configuration (i.e., outer pleated filter media and inner non-pleated filter media). The non-pleated and pleated cylinders of the inner element are bonded, potted, embedded or otherwise attached at their ends to endcaps (6c, top end cap, and 6d, bottom end cap) located at opposite ends of the cylinders.

Figure 6:
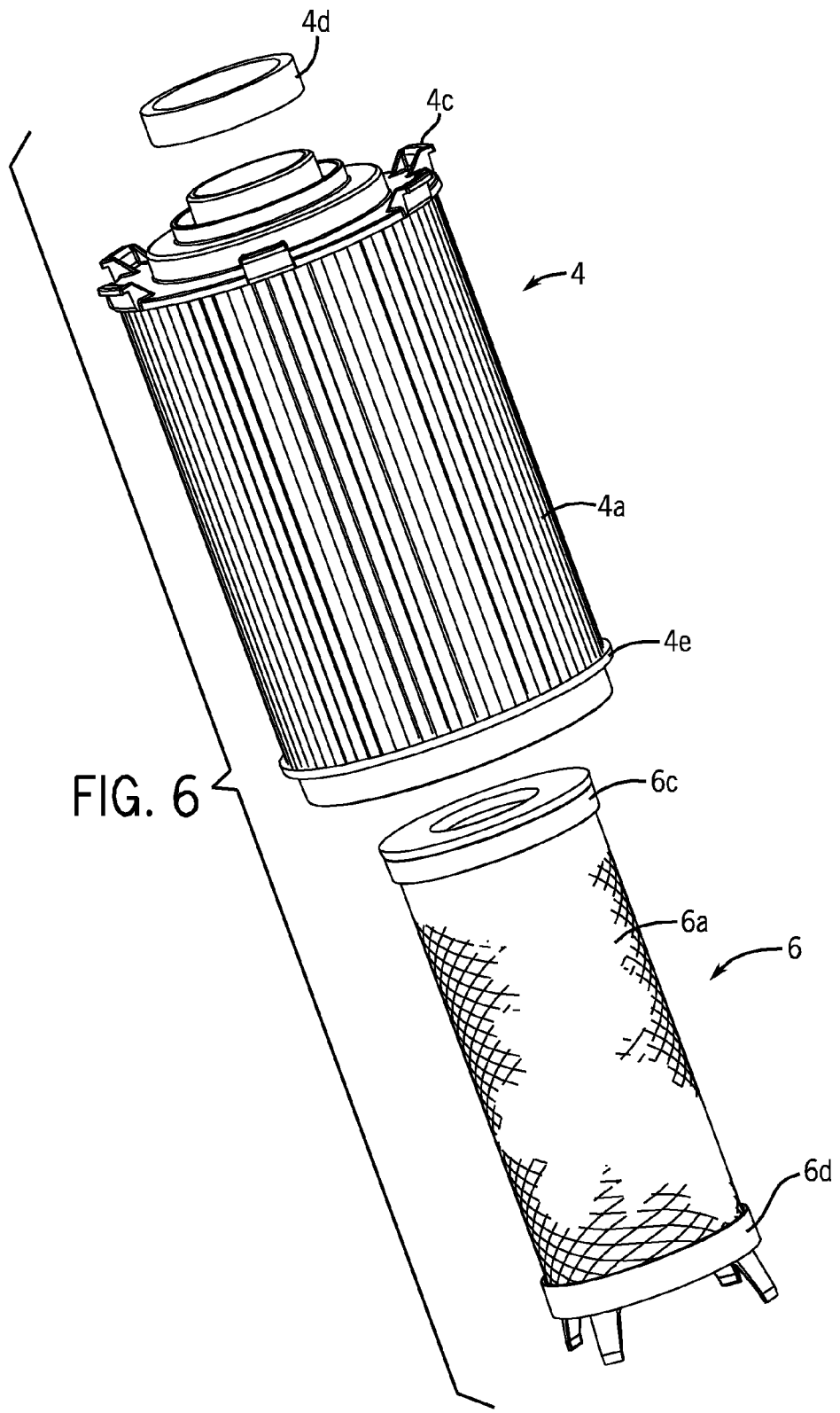
FIG. 6 illustrates an exploded view of one embodiment of a fuel water separator as contemplated herein having an outer element and an inner element.
Figure 7:
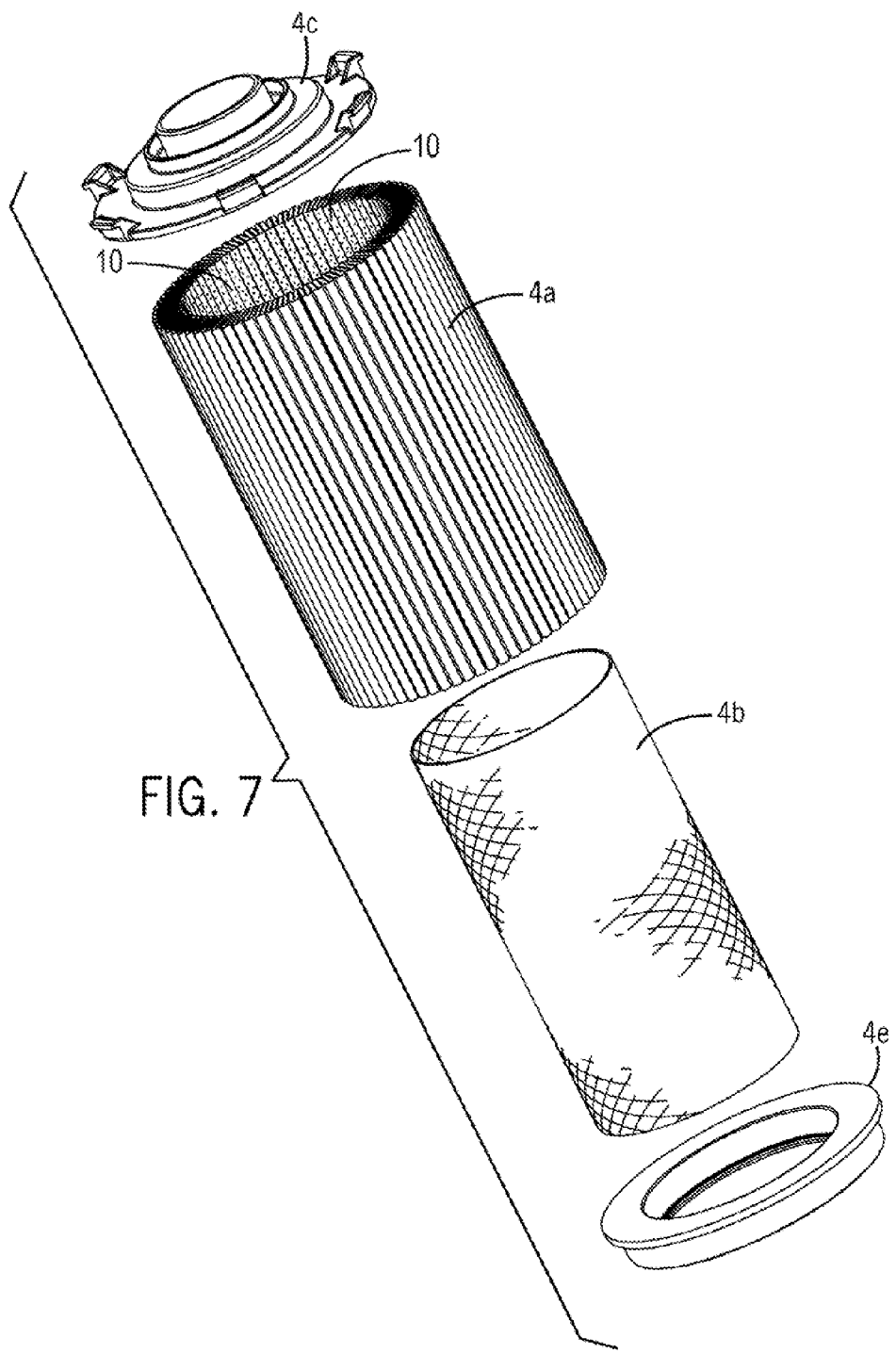
FIG. 7 illustrates an exploded view of one embodiment of an outer element of a fuel water separator as contemplated herein.
Figure 8:
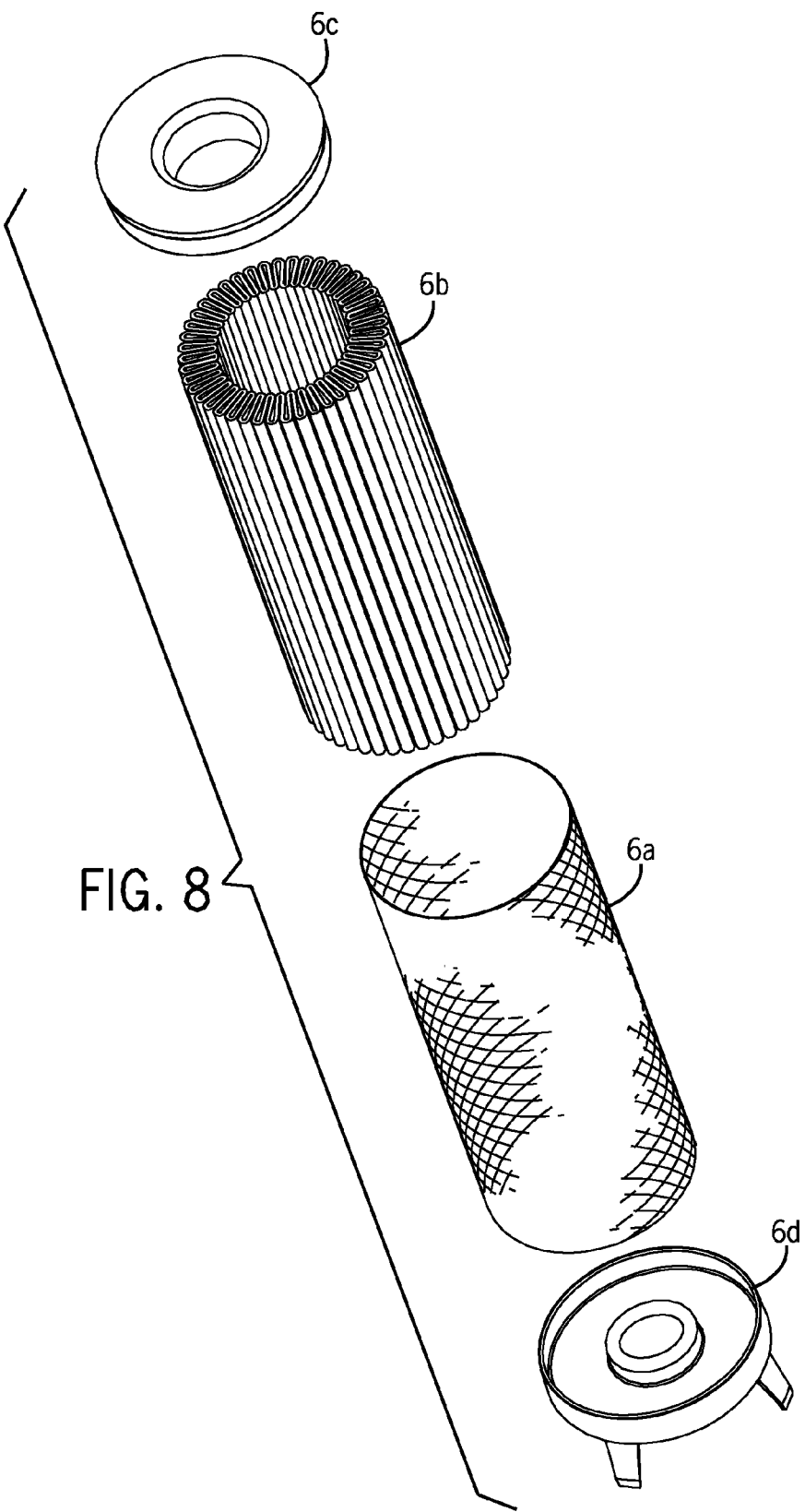
FIG. 8 illustrates an exploded view of one embodiment of an inner element of a fuel water separator as contemplated herein.
Figure 9:
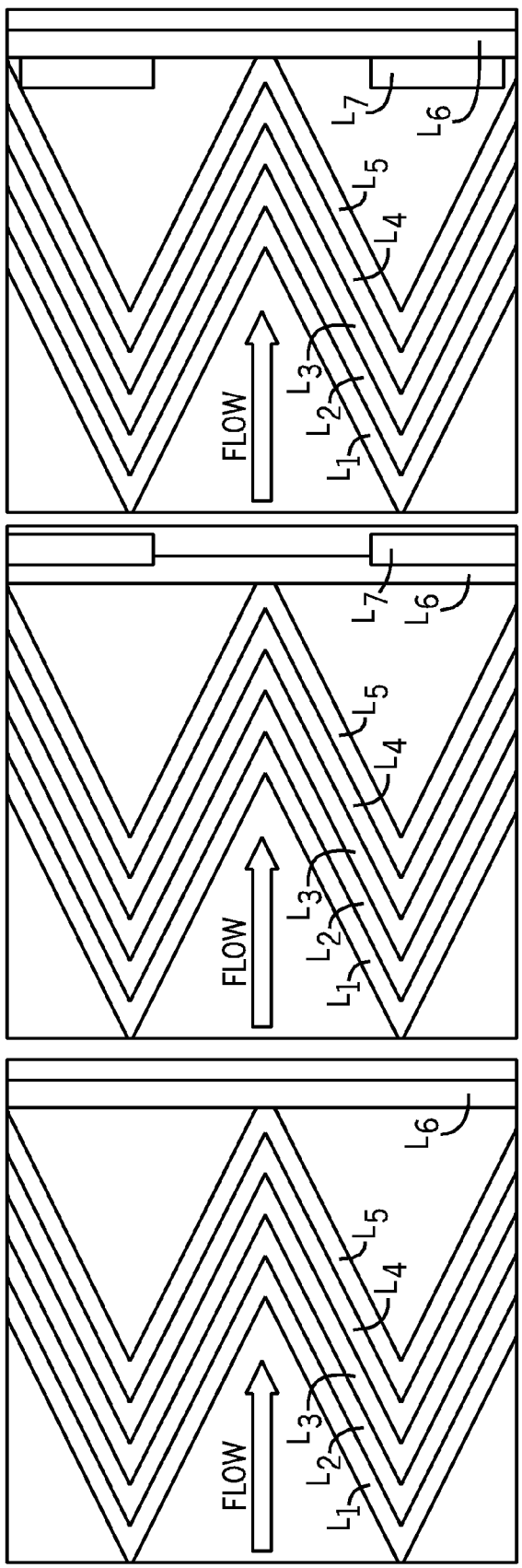
FIG. 9 illustrates a cross-sectional view of embodiments of an outer element of a fuel water separator as contemplated herein showing media layers and configuration. A. Embodiment without supporting center tube or screen. B. Embodiment with supporting center tube or screen (7) inside of non-pleated media cylinder (6). C. Embodiment with supporting center tube or screen (7) between pleated media (1-5) and non-pleated media cylinders (6).

Referring now to FIGS. 6-8, shown is one embodiment of a thermoplastic filter-in-filter fuel water separator (FWS) and particulate filter as contemplated herein. FIG. 9 shows cross-sectional views embodiments of the outer element of the presently disclosed, filter-in-filter fuel water separator (FWS) and particulate filter. FIG. 9A shows an embodiment without a center tube, screen or other supporting structure for the media of the outer element. FIG. 9B shows an embodiment with a center tube, screen or other supporting structure for the media located downstream of and adjacent to the non-pleated media cylinder. FIG. 9C shows an embodiment with a center tube, screen or other supporting structure for the media located between, adjacent to, and touching both the upstream pleated media cylinder and the downstream non-pleated media cylinder. In FIG. 9, the numerals 1-5 indicate, in order from upstream to downstream, the different layers of media of The outer element of FIGS. 9B and 9C includes 6 layers of media material and a supporting structure. However, the outer element may include fewer or additional layers depending on the requirements of the system in which the filter cartridge is utilized. For illustrative purposes only, three coalescers referred to as X, Y, and Z are described in Table 1 including the typical properties of each layer of media of these coalescers.

TABLE 1

Exemplary Media Layers and Properties for Outer Stage

| | Layer Material | Nominal Mean Fiber Diameter (μm) | Mean Pore Size (μm) | Max Pore Size (μm) | Permeability (cfm) | Thickness (mm) | Basis Weight (gsm) |
|---|---|---|---|---|---|---|---|
| *Coalescer X - Velocity Change Coalescer* | | | | | | | |
| 1 | Polybutylene terephthalate Nonwoven | >10 | >50 | >100 | >250 | >0.3 | >40 ± 5 |
| 2 | Polybutylene terephthalate Nonwoven | 1.0-4.0 | 5.0-15.0 | 10.0-20.0 | 35-55 | 0.7-0.15 | 27 ± 5 |
| 3 | Polybutylene terephthalate Nonwoven | 1.0-5.0 | 15.0-30.0 | 25.0-40.0 | 75-100 | 0.15-0.3 | 33 ± 5 |
| 4 | Polyamide Nonwoven | 0.1-1.0 | <8.0 | 5.0-15.0 | 5.0-20.0 | 0.1-0.25 | >20 |
| 5 | Polyethylene terephthalate Nonwoven | >40 | 20.0-40.0 | 40-60 | 50-75 | 0.4-0.7 | 198 ± 20 |
| 6 | Polyethylene terephthalate Nonwoven | >20 | 25-45 | 40-60 | 150-200 | 0.8-1.2 | 100 ± 20 |
| *Coalescer Y - Single Layer Surface Coalescer* | | | | | | | |
| 4 | Polyamide Nonwoven | 0.1-1.0 | <8.0 | 5.0-15.0 | 5.0-20.0 | 0.1-0.25 | >20 |
| 5 | Polyethylene terephthalate Nonwoven (optional) | >40 | 20.0-40.0 | 40-60 | 50-75 | 0.4-0.7 | 198 ± 20 |
| 6 | Polyethylene terephthalate Nonwoven | >20 | 25-45 | 40-60 | 150-200 | 0.8-1.2 | 100 ± 20 |
| *Coalescer Z - Surface Coalescer* | | | | | | | |
| 3 | Polybutylene terephthalate Nonwoven | 1.0-5.0 | 15.0-30.0 | 25-40 | 75-100 | 0.15-0.3 | 33 ± 5 |
| 4 | Polyamide Nonwoven | 0.1-1.0 | <8.0 | 5.0-15.0 | 5.0-20.0 | 0.1-0.25 | >20 |
| 5 | Polyethylene terephthalate Nonwoven (optional) | >40 | 20-40 | 40-60 | 50-75 | 0.4-0.7 | 198 ± 20 |
| 6 | Polyethylene terephthalate Nonwoven | >20 | 25-45 | 40-60 | 150-200 | 0.8-1.2 | 100 ± 20 | the pleated media cylinder. The numeral 6 indicates the non-pleated media and 7 indicates the structure, e.g., center tube, screen, spring, etc., that supports the media of the outer element. As shown, the pleated cylinder comprises three layers of thermoplastic, fibrous filter media (Layers 1-3), one layer of thermoplastic nanofiber media (Layer 4), and a final layer of thermoplastic, fibrous media (Layer 5). The non-pleated cylinder comprises a layer of thermoplastic fibrous media (Layer 6) formed as a tube and placed inside the pleated media cylinder with its upstream face either in direct contact with the pleated media cylinder or in indirect contact with the pleated media cylinder via the intermediary supporting structure (7), as shown. The optional supporting structure (7) may function to prevent the non-pleated cylinder from collapsing under flow and pressure drop when the cartridge is used in a fuel water separation system. However, preferably the pleated and non-pleated cylinders together provide sufficient strength and stiffness rendering the supporting structure optional. In FIG. 9C, the supporting structure provides support to the pleated cylinder, whose inner pleat tips are in direct contact with the supporting structure, while the non-pleated cylinder is located inside, downstream of, and in direct contact with the support structure. In some embodiments, the non-pleated cylinder may be thermally welded to or injection molded with the thermoplastic center tube to affix it to the support structure. Typically, the axial lengths of all 7 layers are the same. Both ends of each of the cylinders are either embedded into endcaps or potted in an adhesive, e.g., polyurethane, to attach the ends of the cylinders to the endcaps and prevent bypass of unfiltered fluid around the media during use in a fuel water separation system (FIGS. 1-8).

The media combinations of these three coalescers reflect design choices based on the observation that in low interfacial tension systems, such as ULSD and biodiesel, there is relatively little thermodynamic drive for coalescence and the kinetics of coalescence tend to be slow. These coalescers are designed to physically slow down the passage of droplets of a dispersed phase in a continuous phase (e.g., dispersed droplets of water in hydrocarbon fuel) through the media and to increase the concentration of the droplets locally within the coalescer in order to facilitate coalescence and drop size growth.

In Coalescer X, at least 6 media layers with an optional supporting structure are used. Coalescer X may be referred to as a "velocity change coalescer" (see PCT Publication No. WO 2010/042706, which is incorporated by reference herein in its entirety) having a filter-in-filter configuration (see USPTO Publication Nos. US 2009/0065419; US 2009/0250402; and US 2010/0101993, which are incorporated by reference herein in their entireties). Layer 1 functions as a pre-filter and to reduce the pressure drop across the outer element. Layer 1 is more "open" (i.e., having a higher porosity, larger pore size, larger mean fiber diameter, higher Frasier permeability, and/or lower contaminant removal efficiency) than Layer 2. Layer 2 functions to capture fine emulsified droplets, for example water droplets in ultralow sulfur diesel fuel. Layer 2 is "tighter" (i.e., having a lower porosity, smaller pore size, smaller mean fiber diameter, lower Frasier permeability, and/or higher contaminant removal efficiency) than Layer 3. Layer 3 functions to reduce the fluid velocity within the media and provide a space for droplets captured in Layer 2 to drain, accumulate, and coalesce. The physical properties of Layer 3 are such that the fluid velocity in this layer is less than the fluid velocity in Layer 4. Layer 3 is more "open" (i.e., having a higher porosity, larger pore size, larger mean fiber diameter, higher Frasier permeability, and/or lower contaminant removal efficiency) than Layer 4. Layer 4 functions to capture droplets that were not captured by the previous layers, especially the finer droplets, and to serve as a semi-permeable barrier to the passage of captured droplets. The semi-permeable barrier function of Layer 4 causes droplets to concentrate and accumulate in Layer 3, giving the droplets more time and greater probability for coalescence to occur. The semi-permeable barrier function of Layer 4 also gives rise to localized increased fluid velocity and a transient increase in drop surface area, which further enhances coalescence. The physical properties of Layer 4 are such that the fluid velocity in this layer is higher than the fluid velocity in Layer 5. Layer 4 is "tighter" (i.e., having a lower porosity, smaller pore size, smaller mean fiber diameter, lower Frasier permeability, and/or higher contaminant removal efficiency) than Layer 5. Layer 4 typically is thermoplastic nanofiber filter media with a diameter of less than 1 µm (e.g., in order to achieve the very high water removal efficiency requirements and to accommodate the small droplet size for modern high pressure common rail diesel fuel systems running of ULSD or biodiesel). Layer 5 functions to create a lower velocity environment in which the coalesced drops formed in the previous layers may collect and drain through prior to release. Layer 5 is more "open" (i.e., having a higher porosity, larger pore size, larger mean fiber diameter, higher Frasier permeability, and/or lower contaminant removal efficiency) than Layer 4. Layer 6 functions to provide release sites for coalesced drops in a low energy environment. Layer 6 is more "open" (higher porosity, larger pore size, larger mean fiber diameter, higher Frasier permeability, and/or lower contaminant removal efficiency) than Layer 5.

In Coalescer Y, two or three layers of media are utilized with or without an optional supporting structure. Coalescer Y may be referred to as a "single layer surface coalescer" (see USPTO Application Ser. No. 61/178,738, filed on May 15, 2009 and USPTO application Ser. No. 12/780,392, filed on May 14, 2010, and published as USPTO Publication No. 2011/0124941, which are incorporated herein by reference in their entireties) having a filter-in-filter configuration (see USPTO Publication Nos. US 2009/0065419; US 2009/0250402; and US 2010/0101993, which are incorporated by reference herein in their entireties). In Coalescer Y, Layer 4 functions to provide a semi-permeable barrier to the passage of fine emulsified droplets, forcing them to concentrate at its upstream surface. As such, droplets have sufficient time and a suitable environment for coalescence and drop growth to occur. Layer 4 is a relatively "tight" layer with characteristics comparable to Layer 4 in Coalescer X or even tighter. This layer utilizes "sieving" to prevent passage of fine droplets and typically comprises thermoplastic nanofiber filter media with a mean pore size, M, smaller than the mean size of the influent droplets and a maximum to mean pore size ratio of less than 3 (i.e., $M_M/M \leq 3$). In some embodiments, a water drain is present on the upstream face of the outer element through which drops coalesced at the upstream surface of Layer 4 drain, while in other embodiments, there may be a water drain present on the downstream side of the outer element to collect coalesced water that has been forced through the media at release sites by the pressure drop across the coalescing element. Coalescer Y has an optional Layer 5 to provide structural support for Layer 4, if required, and to serve as a drainage path for any coalesced drops forced through Layer 4. Layer 5 connects Layer 4 to the release Layer 6. Layer 5 also functions to create a lower velocity, lower energy environment in which the coalesced drops formed in the previous layers may collect and drain through prior to release. Layer 5 is more "open" than Layer 4 and is structurally stronger, in order to provide support to Layer 4 and to facilitate processing of the media. Coalescer Y has an additional non-pleated Layer 6 downstream of the previously described Layer 4 and Layer 5. Layer 6 functions to provide release sites for coalesced drops in a low energy environment. As such, Layer 6 is more "open" than Layer 5.

In Coalescer Z, three or more media layers with an optional supporting structure are utilized (see USPTO Application Ser. No. 61/179,170, filed on May 18, 2009; USPTO Application Ser. No. 61/179,939, filed on May 20, 2009; and USPTO application Ser. No. 12/780,392, filed on May 14, 2010, and published as USPTO Publication No. 2011/0124941, which are incorporated herein by reference in their entireties). Coalescer Z is a more complex surface coalescer than Coalescer Y and has a filter-in-filter configuration (see USPTO Publication Nos. US 2009/0065419; US 2009/0250402; and US 2010/0101993, which are incorporated by reference herein in their entireties). Layer 3 functions to reduce the pressure drop across the coalescer and, secondarily, to serve as a particulate prefilter for the coalescer and to increase its service life. Layer 3 is more "open" than Layer 4 and has a higher capillary pressure (i.e., a more positive capillary pressure) than Layer 4. The function and properties of Layers 4, 5 (optional) and Layer 6 are as described for Coalescer Y.

In all three coalescers X, Y, and Z, the nature of the transition from Layer 5 to Layer 6 is important. Layers 1-5 typically are pleated. As such, the fluid flow profile within the pleat and drag on captured drops causes them to accumulate in the valleys (downstream direction) of the pleats. This results in droplets concentrating in this localized region, increasing coalescence by providing increased time for drops to coalesce before they are released. It has been observed by the present inventors that coalesced drops tend to be released from the same active regions or areas on the downstream face of coalescers, while little drop release occurs elsewhere. This suggests that once a drainage path through the media is created, it is repeatedly used. In the presently disclosed filter cartridges, preferred drainage paths ending in larger pores are created by the direct contact of the inner pleat tips of Layer 4 (for Coalescers Y and Z) or Layer 5 (for Coalescer X, as well as, Y and Z if this layer is included) to the upstream surface of non-pleated Layer 6. At the point of contact between the pleated and non-pleated layers, a localized disruption of the media pore structure exists which gives rise to these preferred drainage paths. This results in larger drops being released. Further, these drainage paths occur at the bottoms of pleat valleys where coalesced drops concentrate and the effect is greatest. Direct contact between Layers 4 or 5, and Layer 6 is not required in order to achieve this result. For example, the inner pleat tips of the most downstream layer of the pleated section may directly contact the porous supporting structure 7, which is in turn in direct contact with Layer 6 on its downstream side, as shown in FIG. 9C.

In an additional embodiment (not illustrated), the pleated coalescer media could be as described in Coalescers X, Y or Z, except that Layer 6, the non-pleated release layer, would be omitted. This configuration utilizes the same fluid flow profile within the pleat and drag on captured drops effects as Coalescers X, Y or Z, to cause droplets and coalesced drops to concentrate in the valleys of the pleats to enhance coalescence. Instead of coalesced drops draining to a release layer, Layer 6, however, drops are released from small slits or holes 10 in the inner pleat tips. (See FIG. 7), These slits or holes 10 could be produced by needle punching or other means and may be on the order of 30-300 μm in size. These slits or holes 10 in the inner pleat tips serve as release points for the coalesced drops.

The inner element of the presently disclosed filter cartridge functions to separate coalesced water drops from the fuel and to remove fine solid contaminants from the fluid. The inner element comprises an outer non-pleated cylinder in direct contact with an inner pleated cylinder. Typically, the axial lengths of both non-pleated and pleated cylinders are the same. Both ends of each of the cylinders are either embedded into endcaps or potted in an adhesive, e.g., polyurethane, to attach the ends of the cylinders to the endcaps and prevent bypass of unfiltered fluid around the media during use in a fuel water separation system (FIGS. 1-8).

Figure 10:
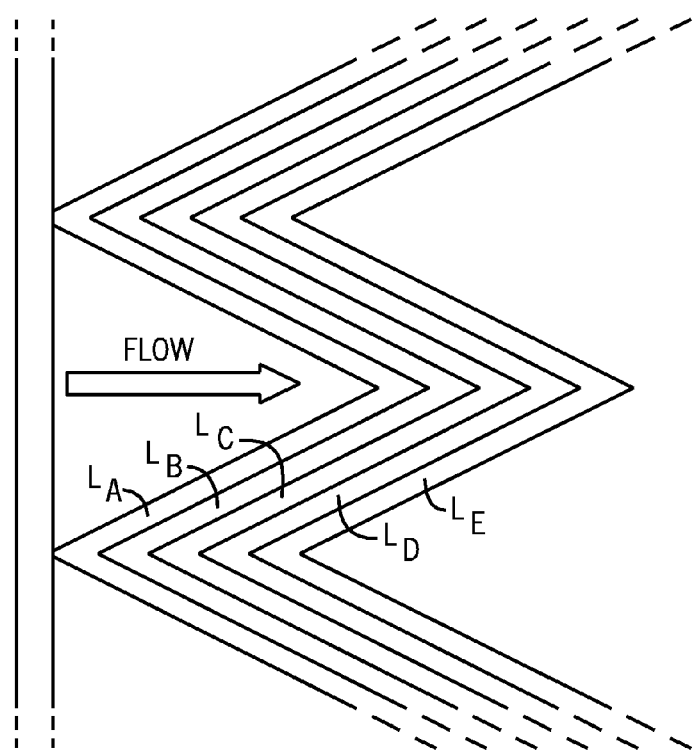
FIG. 10 illustrates a cross-sectional view of embodiments of an inner element of a fuel water separator as contemplated herein showing media layers and configuration.

The inner element typically includes of at least 4 layers of media material (FIG. 10). The purpose of the first layer, Layer A, is to separate coalesced (water) drops from the continuous phase (fuel). This layer preferably comprises a woven thermoplastic mesh in the form of a tube that repels the drops and allows them to drain freely from the surface. Layer A is outside of and in direct contact with the inner pleated cylinder. The mesh opening of this layer typically is less than 100 μm and preferably less than 50 μm. The function of the pleated layers is to capture solid contaminants and droplets not removed by the upstream layers of the outer filter element. The first two of these pleated layers, Layers B and C in FIG. 10 and Table 2, are transitional layers which function to reduce pressure drop, to provide further removal of drops and droplets, and to reduce solids from collecting on the following nanofiber filtration layer, Layer D. Layer B also facilitates manufacturing and processing of the composite material.

TABLE 2

Exemplary Media Layers and Properties of Inner Stage

| Layer | Material | Nominal Mean Fiber Diameter (μm) | Mean Pore Size (μm) | Max Pore Size (μm) | Permeability (cfm) | Thickness (mm) | Basis Weight (gsm) |
|---|---|---|---|---|---|---|---|
| A | Polyethylene terephthalate Woven Screen | * | 30-50 | 30-50 | 400-600 | 0.03-0.1 | 37 ± 10 |
| B | Polybutylene terephthalate Nonwoven | >10 | >50 | >100 | 225-325 | 0.3-0.5 | 48 ± 10 |
| C | Polybutylene terephthalate Nonwoven | 1.0-5.0 | 5.0-15.0 | 10.0-25.0 | 35-55 | 0.1-0.3 | 38 ± 10 |
| D | Polyamide Nonwoven | 0.1-0.8 | 1.0-8.0 | 1.0-10.0 | 3.0-20.0 | 0.1-0.3 | >20 |
| E | Polyethylene terephthalate Nonwoven | >40 | 20-35 | 40-65 | 50-75 | 0.45-0.65 | 198 ± 20 |

These layers have properties similar to Layers 1 and 2 in the outer element. The next pleated layer, Layer D in FIG. 10 and Table 2, functions as a high efficiency filter for fine particles (e.g., particles having diameter of 4 μm or smaller). For high pressure common rail applications, very high removal efficiencies for particles as small as 4 μm typically are required to protect the fuel injectors. The layers upstream of Layer D function primarily to remove and separate droplets. Layer D functions to protect the downstream system from being contaminated by fine solids. Layer D also functions to remove droplets that may have passed through the preceding layers. Preferably, Layer D is "tighter" than any of the other layers of the outer element or the inner element and includes thermoplastic nanofiber filter media with a diameter of less than 1 μm. Minimally, Layer D of the inner element is as "tight" as Layer 4 of the outer element. The final layer, Layer E, functions to provide support for the preceding layers without significantly increasing the pressure drop. Layer E is a relatively "open" media having sufficient strength and stiffness to support the upstream layers under conditions of use and to facilitate processing of the inner element media.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible. The afore-cited patents and published applications are incorporated herein by reference in their entireties.

What is claimed is:

1. A filter cartridge structured for coalescing a dispersed phase from a mixture of the dispersed phase in a continuous phase as the mixture moves through the cartridge from outside to inside, the cartridge comprising:
   (a) an outer filter element, the outer filter element comprising:
      (i) an outer pleated filter material where the outer pleated filter material has a substantially cylindrical shape and comprises thermoplastic composite material having a permeability of less than about 40 cfm, wherein the composite material is formed from at least the following layers:
         (1) a top layer comprising a polymeric nonwoven, the top layer having a mean fiber diameter of >10 μm, the top layer having a higher porosity, a larger pore size, a larger mean fiber diameter, a higher Frasier permeability, and a lower contaminant removal efficiency than a layer immediately downstream of the top layer;
         (2) a nanofiber layer comprising a polymeric nonwoven, the nanofiber layer having a mean fiber diameter of 0.1-1.0 μm, the nanofiber layer having a mean pore size of <8 μm; and the nanofiber layer having a maximum to mean pore size ratio of less than about 3; and
         (3) a support layer comprising a polymeric nonwoven, the support layer having a mean fiber diameter of >20 μm, the support layer having a larger pore size, a larger mean fiber diameter, a higher Frasier permeability, and a lower contaminant removal efficiency than a layer immediately upstream of the support layer;
      (ii) end caps attached to opposite ends of the outer pleated filter material; and
   (b) an inner filter element located within the outer filter element; the inner filter element comprising:

(i) an outer non-pleated filter material where the outer non-pleated filter material has a substantially cylindrical shape;

(ii) an inner pleated filter material in contact directly or indirectly with the outer non-pleated filter material, wherein the inner pleated filter material has a substantially cylindrical shape and comprises thermoplastic composite material having a permeability of less than about 20 cfm, wherein the composite material is formed from:

(1) a top layer comprising a polymeric nonwoven, the top layer having a mean fiber diameter of >10 μm, the top layer having a higher porosity, a larger pore size, a larger mean fiber diameter, a higher Frasier permeability, and a lower contaminant removal efficiency than a layer immediately downstream of the top layer;

(2) a nanofiber layer comprising a polymeric nonwoven, the nanofiber layer having a mean fiber diameter of 0.1-1.0 μm, the nanofiber layer having a mean pore size of <8 μm; and the nanofiber layer having a maximum to mean pore size ratio of less than about 3; and (3) a support layer comprising a polymeric nonwoven, the support layer having a mean fiber diameter of >20 μm, the support layer having a larger pore size, a larger mean fiber diameter, a higher Frasier permeability, and a lower contaminant removal efficiency than a layer immediately upstream of the support layer; and (iii) end caps attached to opposite ends of the outer non-pleated filter material and the inner pleated filter material.

2. The cartridge according to claim 1, wherein the outer filter element further comprises: (iii) an inner non-pleated filter material in contact directly or indirectly with the outer pleated filter material at inner pleat tips of the outer pleated filter material, wherein the inner non-pleated filter material has a substantially cylindrical shape and the end caps are attached to opposite ends of the inner non-pleated filter material.

3. The cartridge according to claim 2, wherein the inner non-pleated filter material of the outer filter element comprises polymeric material.

4. The cartridge according to claim 3, wherein the polymeric material is thermoplastic material.

5. The cartridge according to claim 2, wherein the entire cartridge is polymeric material.

6. The cartridge according to claim 5, wherein the polymeric material is thermoplastic material.

7. The cartridge according to claim 2, wherein the outer filter element further comprises:

(iv) a support structure selected from a group consisting of a permeable tube, a screen, a spring, a cage-like structure, wherein the support structure contacts the inner non-pleated material of the outer filter element.

8. The cartridge according to claim 7, wherein the support structure is located at the inner face of the inner non-pleated filter material of the outer filter element and the inner non-pleated filter material directly contacts the outer pleated filter material of the outer filter element at the inner pleat tips.

9. The cartridge according to claim 7, wherein the support structure is located at the outer face of the inner non-pleated filter material of the outer filter element and the inner non-pleated filter material indirectly contacts the outer pleated filter material of the outer filter element at the inner pleat tips via the support structure.

10. The cartridge according to claim 1, wherein the outer pleated filter material of the outer filter element has slits or holes in valleys of the pleated filter material.

11. The cartridge according to claim 1, wherein the outer non-pleated filter material of the inner filter element comprises polymeric material.

12. The cartridge according to claim 11, wherein the polymeric material is thermoplastic material.

13. The cartridge according to claim 1, wherein the entire cartridge is polymeric material.

14. The cartridge according to claim 13, wherein the polymeric material is thermoplastic material.

15. The cartridge according to claim 1, wherein the nanofiber layer comprises polyamide material.

16. The cartridge according to claim 1, wherein the outer pleated filter material is formed by physically or chemically coupling the top layer, the nanofiber layer, and the bottom layer.

17. The cartridge according to claim 1, wherein the outer pleated filter material is formed by electroblowing a media material and combining the electroblown media material and another media material in layers.

18. The cartridge according to claim 1, wherein the cartridge is configured for coalescing water dispersed in a continuous phase of hydrocarbon fuel.

19. The cartridge according to claim 18, wherein the outer non-pleated filter material of the inner filter element is hydrophobic.

20. The cartridge according to claim 18, where a drop of water in the hydrocarbon fuel has a contact angle on the outer non-pleated filter material of the inner filter element that is no less than 90°.

21. The cartridge according to claim 1, wherein the end caps comprise polymeric material.

22. The cartridge according to claim 21, wherein the polymeric material is thermoplastic material.

23. The cartridge according to claim 1 contained in a housing, the housing having an upstream inlet structured to receive the mixture, a downstream outlet structured to discharge the mixture after coalescing of the dispersed phase, and a downstream outlet structured to discharge the coalesced dispersed phase.

24. A fuel water separation system comprising the cartridge according to claim 1.

25. The fuel water separation system according to claim 24, structured for removing water dispersed in hydrocarbon fuel.

26. The fuel water separation system according to claim 24, further comprising a hydrophobic media for removing water positioned downstream of the cartridge.

27. The fuel water separation system according to claim 24, further comprising an additional device for removing water positioned downstream of the filter cartridge, the device selected from a group consisting of gravity separator, centrifuge, impactor, lamella separator, inclined stacked plate, screen, water absorber, and quiescent chamber.

28. The cartridge according to claim 1, wherein the outer filter element further comprises a permeable tube, a screen, a spring, and a cage-like structure downstream of the outer pleated filter material.

29. A method of removing water dispersed in hydrocarbon fuel, the method comprising passing a mixture comprising hydrocarbon fuel and water dispersed in the hydrocarbon fuel through the filter cartridge of claim 1 and removing at least about 95% of water dispersed in the hydrocarbon fuel.

30. A thermoplastic filter-in-filter cartridge comprising an outer filter element and an inner filter element,
the outer filter element comprising:
(a) an outer pleated filter material where the outer pleated filter material has a substantially cylindrical shape and comprises thermoplastic composite material, and wherein the composite material is formed from at least the following layers:
(1) a top layer comprising a polymeric nonwoven, the top layer having a mean fiber diameter of >10 µm, the top layer having a higher porosity, a larger pore size, a larger mean fiber diameter, a higher Frasier permeability, and a lower contaminant removal efficiency than a layer immediately downstream of the top layer;
(2) a nanofiber layer comprising a polymeric nonwoven, the nanofiber layer having a mean fiber diameter of 0.1-1.0 µm, the nanofiber layer having a mean pore size of <8 µm; and the nanofiber layer having a maximum to mean pore size ratio of less than about 3; and
(3) a support layer comprising a polymeric nonwoven, the support layer having a mean fiber diameter of >20 µm, the support layer having a larger pore size, a larger mean fiber diameter, a higher Frasier permeability, and a lower contaminant removal efficiency than a layer immediately upstream of the support layer;
(b) end caps attached to opposite ends of the outer pleated filter material; and
(c) optionally one of:
(i) an inner non-pleated filter material in contact directly or indirectly with the outer pleated filter material at inner pleat tips of the outer pleated filter material, wherein the inner non-pleated filter material has a substantially cylindrical shape and the end caps are attached to opposite ends of the inner non-pleated filter material; and
(ii) slits or holes in valleys of the pleated filter material; and
the inner filter element comprising:
(a) an outer non-pleated filter material where the outer non-pleated filter material has a substantially cylindrical shape;
(b) an inner pleated filter material in contact directly or indirectly with the outer non-pleated filter material, wherein the inner pleated filter material has a substantially cylindrical shape and comprises thermoplastic composite material; and
wherein the composite material is formed from at least the following layers:
(1) a top layer comprising a polymeric nonwoven, the top layer having a mean fiber diameter of >10 µm, the top layer having a higher porosity, a larger pore size, a larger mean fiber diameter, a higher Frasier permeability, and a lower contaminant removal efficiency than a layer immediately downstream of the top layer;
(2) a nanofiber layer comprising a polymeric nonwoven, the nanofiber layer having a mean fiber diameter of 0.1-1.0 µm, the nanofiber layer having a mean pore size of <8 µm; and the nanofiber layer having a maximum to mean pore size ratio of less than about 3; and
(3) a support layer comprising a polymeric nonwoven, the support layer having a mean fiber diameter of >20 µm, the support layer having a larger pore size, a larger mean fiber diameter, a higher Frasier permeability, and a lower contaminant removal efficiency than a layer immediately upstream of the support layer; and
(c) end caps attached to opposite ends of the outer non-pleated filter material and the inner pleated filter material.

31. The cartridge according to claim 30, wherein the outer filter element further comprises a permeable tube, a screen, a spring, and a cage-like structure downstream of the outer pleated filter material.

32. A filter element comprising:
(a) an outer pleated filter material where the outer pleated filter material has a substantially cylindrical shape and comprises thermoplastic composite material;
(b) end caps attached to opposite ends of the outer pleated filter material; and optionally one of:
(i) an inner non-pleated filter material in contact directly or indirectly with the outer pleated filter material at inner pleat tips of the outer pleated filter material, wherein the inner non-pleated filter material has a substantially cylindrical shape; and
(ii) slits or holes in valleys of the pleated filter material;
wherein the composite material is formed from at least the following layers:
(1) a top layer comprising a polymeric nonwoven, the top layer having a mean fiber diameter of >10 µm, the top layer having a higher porosity, a larger pore size, a larger mean fiber diameter, a higher Frasier permeability, and a lower contaminant removal efficiency than a layer immediately downstream of the top layer;
(2) a nanofiber layer comprising a polymeric nonwoven, the nanofiber layer having a mean fiber diameter of 0.1-1.0 µm, the nanofiber layer having a mean pore size of <8 µm; and the nanofiber layer having a maximum to mean pore size ratio of less than about 3; and
(3) a support layer comprising a polymeric nonwoven, the support layer having a mean fiber diameter of >20 µm, the support layer having a larger pore size, a larger mean fiber diameter, a higher Frasier permeability, and a lower contaminant removal efficiency than a layer immediately upstream of the support layer.

33. The filter element according to claim 32, wherein the filter element is an outer filter element structured for use in a filter-in-filter cartridge.

34. The filter element according to claim 32, further comprising a permeable tube, a screen, a spring, and a cage-like structure downstream of the outer pleated filter material.

35. A filter element comprising:
(a) an outer non-pleated filter material where the outer non-pleated filter material has a substantially cylindrical shape and comprises thermoplastic hydrophobic material;
(b) an inner pleated filter material in contact directly or indirectly with the outer non-pleated filter material, wherein the inner pleated filter material has a substantially cylindrical shape and comprises thermoplastic composite material; and
(c) end caps attached to opposite ends of the outer non-pleated filter material and the inner pleated filter material;
wherein the composite material is formed from at least the following layers:
(1) a top layer comprising a polymeric nonwoven, the top layer having a mean fiber diameter of >10 µm, the top layer having a higher porosity, a larger pore size, a larger mean fiber diameter, a higher Frasier permeability, and a lower contaminant removal efficiency than a layer immediately downstream of the top layer;

(2) a nanofiber layer comprising a polymeric nonwoven, the nanofiber layer having to mean fiber diameter of 0.1-1.0 μm, the nanofiber layer having a mean pore size of <8 μm; and the nanofiber layer having a maximum to mean pore size ratio of less than about 3; and (3) a support layer comprising a polymeric nonwoven, the support layer having a mean fiber diameter of >20 μm, the support layer having a larger pore size, a larger mean fiber diameter, a higher Frasier permeability, and a lower contaminant removal efficiency than a layer immediately upstream of the support layer.

36. The filter element according to claim 35, wherein the filter element is an inner filter element structured for use in a filter-in-filter cartridge.

\* \* \* \* \*